(12) United States Patent
Laughlin

(10) Patent No.: US 7,171,853 B1
(45) Date of Patent: Feb. 6, 2007

(54) MAGNETOHYDRODYNAMIC (MHD) ACTUATOR SENSOR

(75) Inventor: Darren R. Laughlin, Albuquerque, NM (US)

(73) Assignee: Applied Technology Associates, Albuquerque, NM (US)

( * ) Notice: Subject to any disclaimer, the term of this patent is extended or adjusted under 35 U.S.C. 154(b) by 0 days.

(21) Appl. No.: 11/239,283

(22) Filed: Sep. 30, 2005

(51) Int. Cl.
*G01P 15/08* (2006.01)
*G01P 9/00* (2006.01)

(52) U.S. Cl. ............................ 73/514.03; 73/504.05; 73/504.07

(58) Field of Classification Search ............. 73/504.05, 73/504.07, 504.17, 514.03, 514.05, 514.06, 73/514.08, 514.09, 652, 654; 310/11
See application file for complete search history.

(56) References Cited

U.S. PATENT DOCUMENTS

| | | | |
|---|---|---|---|
| 4,718,276 A | | 1/1988 | Laughlin |
| 5,003,517 A | * | 3/1991 | Greer, Jr. ............... 367/178 |
| 5,067,351 A | | 11/1991 | Laughlin |
| 5,176,030 A | * | 1/1993 | Laughlin ............. 73/504.07 |
| 5,461,919 A | * | 10/1995 | Laughlin ............. 73/514.03 |
| 5,665,912 A | * | 9/1997 | Laughlin ............. 73/504.05 |
| 6,173,611 B1 | | 1/2001 | Laughlin |

* cited by examiner

*Primary Examiner*—Helen Kwok
(74) *Attorney, Agent, or Firm*—Connolly Bove Lodge & Hutz LLP

(57) ABSTRACT

An MHD sensor/actuator is provided for generating torque as well as sensing angular displacements around a sense/torque axis. A column of conductive liquid which rotates within a circumferential channel having an inner circumferential surface and outer circumferential surface provides an inertial proof mass, the relative motion of which within the channel generates a torque or represents a sensed displacement about the common axis of the circumferential channel. According to certain embodiments, a cylindrical column of magnets are located coaxially with the circumferential channel to produce a radially oriented magnetic field which is perpendicular to the common axis. According to other embodiments, a magnetic ring is provided coaxially with the circumferential channel to produce a magnetic field in the direction of the common axis.

19 Claims, 9 Drawing Sheets

MAGNETOHYDRODYNAMIC (MHD) ACTUATOR SENSOR

GOVERNMENT RIGHTS

This invention was made with Government support under contract HQ0006-03-C-0066 awarded by the Missile Defense Agency. The Government has certain rights in the invention.

BACKGROUND OF THE INVENTION

The present invention relates to a magnetohydrodynamic device (MHD) which can be used as an actuator to enter a torque, or to sense relative rotational motion.

MHD devices have been developed and used to sense relative rotational motion of an inertial mass with respect to a case. According to prior U.S. patents by the inventor, including U.S. Pat. Nos. 4,718,276, 5,067,351 and 6,173,611, the motion of a sensor about a rotational axis may be detected as a voltage potential representing displacement, velocity, or acceleration about the axis. As set forth in these prior patents, a static magnetic field is arranged perpendicular to a liquid proof mass such as mercury, enclosed within a cylindrical channel. The cylindrical channel has an inside circumference, bearing one electrode, and an outside circumference bearing a second electrode. Due to rotation of the case about the axis of the liquid mass, a voltage is created across the electrodes which represents the displacement in radians of the mass in response to rotational movement of the cylindrical channel with respect to the liquid mass. By detecting the first differential of the voltage, and the second differential voltage, it is possible to obtain velocity and acceleration values of the imparted rotation.

MHD devices can also be operated as a torque producer. By applying a voltage across the channel, a force can be induced between the liquid mass and the channel which provides a torque to the channel vis-à-vis the liquid.

The present invention seeks to provide an MHD device which can both sense relative displacements between an internal liquid proof mass, and a channel containing the device, as well as impart a rotational torque between the liquid mass and dowel containing the liquid mass for applications requiring stabilization. This includes an application for providing active torque to cancel disturbances which are incident to a platform which is subject to vibrational forces or jitter. The MHD actuator has the capability of generating a reaction torque due to the heavy inertial fluid within the channel, and can transfer for angular momentum of the channel to a supporting surface to effectively cancel any disturbances to the platform. Applications in which the torque generation may be used for stabilization include inertial reference unit platforms, fast-steering mirrors line of sight controls, beam steering, scanning control, small satellite attitude control and active structural damping.

In the application of providing for stabilization, it is not only necessary to generate the required disturbance producing counter torque, but it is also required to sense the disturbances themselves, so that the torque of the appropriate magnitude can be applied to the platform to effectively cancel the sensed disturbances.

SUMMARY OF THE INVENTION

An MHD sensor/actuator is provided for generating torque as well as sensing angular displacements around a sensing/torque axis. A column of conductive liquid which rotates within a circumferential channel having an inner circumferential surface and outer circumferential surface provides an inertial proof mass, the relative motion of which within the channel represents a sensed displacement about the common axis of the circumferential channel. A cylindrical column of magnets are located coaxially with the circumferential channel to produce a radially oriented magnetic field which is perpendicular to the common axis. First and second contacts are connected to each end of the column of liquid, and the circumferential channel is sealed with first and second end caps.

The device can be connected to an electrical DC voltage to apply a current to the channel. The flow of current through one end of the channel to the other will produce a rotational torque between the liquid contained within the channel and the channel. The momentum generated from the torque can be transferred to a surface which supports the channel as a damping torque.

Alternatively, instead of applying voltage to the top and bottom ends of the circumferential channel, the voltage generated between the first and second contacts in response to relative motion of the liquid proof mass and circumferential channel may be used to indicate the relative angular velocity between the liquid proof mass and channel.

According to a second embodiment, an MHD actuator/sensor includes a conductive liquid which rotates within a sealed circumferential channel, and a magnet ring located coaxially with the circumferential channel to produce a magnetic field which is axially oriented in the direction of the common axis of the circumferential channel and the magnet structure. The circumferential channel and the magnet ring are enclosed within a case. The relative motion of which within the channel represents a sensed angular velocity about the common axis of the circumferential channel. First and second electrical contacts are connected to an inner circumferential member and an outer circumferential member, respectively, of the circumferential channel.

The device of the second embodiment can be connected to an electrical DC voltage to produce a current through the channel. The flow of current between the outer circumferential member and the inner circumferential member of the channel will produce a rotational torque between the liquid contained within the channel and the channel. The momentum generated from the torque can be transferred to a surface which supports the channel as a damping force. Alternatively, the device can also be used as a sensor, wherein the voltage generated between the first and second contacts in response to relative motion of the liquid proof mass and circumferential channel may be used to indicate the relative angular velocity between the liquid proof mass and channel.

Other features and advantages will become apparent from the following detailed description and drawings.

DETAILED DESCRIPTION

Figure 1:
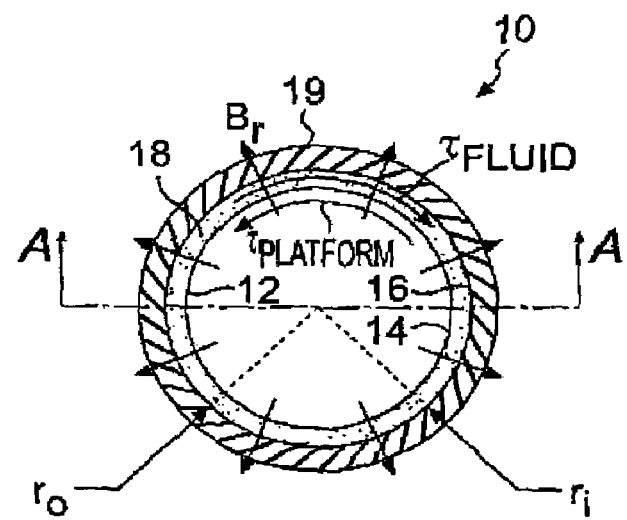
FIG. 1 illustrates a schematic top view of an MHD actuator/sensor including a liquid proof mass according to one.
Figure 2:
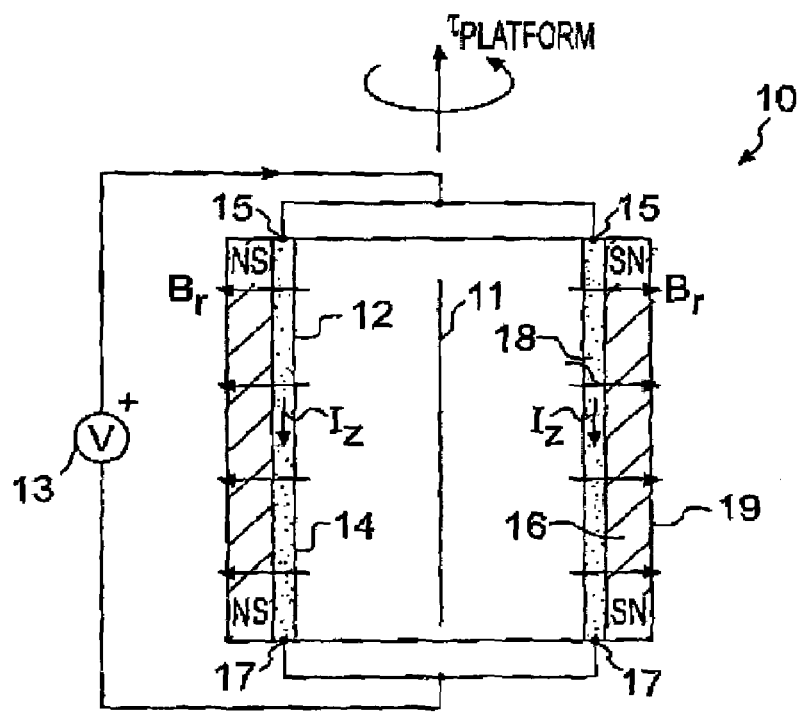
FIG. 2 is a schematic side section view taken along section A—A of FIG. 1.

FIGS. 1 and 2 are section schematic views of a MHD actuator sensor 10 in accordance with one embodiment. A cylindrical channel 12 having an inner circumferential wall 14 and an outer circumferential wall 16 supports a conductive liquid proof mass, such as liquid mercury 18. The inside and outside of the walls 14, 16 are made of insulating material. Walls enclosing opposite ends of the channel 12 include or form electrodes 15, 17. An annular magnet structure 19 surrounds the outer circumference of the cylindrical channel 12. A casing (not shown) encloses the cylindrical channel 12 and the magnetic structure 19.

The magnet structure 19 generates a DC magnetic field $B_r$, which is radial to the common axis 11 of the channel 12 and magnet structure 19 and passes through the channel 12. As will be explained, the application of a voltage V from a power source 13 to electrodes 15, 17 at each end of the channel 12 produces an axially-oriented current flow $I_z$ through the liquid proof mass 18. The result of the interaction of the magnetic field $B_r$ and the current $I_z$ is the generation of a torque $\tau_{fluid}$ between the proof mass 18 and the channel 12. The torque $\tau_{fluid}$ is shown around the axis 11 of the cylindrical channel 12. The general transmitted torque produced about the axis 11 on the channel 12 and the fluid angular acceleration which results in the torque are expressed as shown in the following equations 1 and 2, with reference to the legend presented in Table 1:

$$\tau_{fluid} = -J_{fluid}\ddot{\Theta}_{fluid} \quad (1)$$

$$\ddot{\Theta}_{fluid} = \frac{v}{h^2}(\dot{\Theta}_{case} - \dot{\Theta}_{fluid}) + \frac{-B_r I_z}{A\rho r} \quad (2)$$

TABLE 1

| Variable | Definition |
|---|---|
| Variables in Equations 1 and 2 | |
| v | kinematic viscosity (m²/s) |
| h | channel thickness (m) = $(r_o + r_i)$ |
| r | rms channel radius (m) = $((r_o^2 + r_i^2)/2)^{1/2}$ |
| $B_r$ | channel flux density (T) |
| A | channel mean cross-section area (m²) = $\pi (r_o^2 - r_i^2)$ |
| $\rho$ | fluid density (kg/m³) |
| $\ddot{\Theta}_{fluid}$ | fluid angular acceleration (rad/s²) |
| $\dot{\Theta}_{fluid}$ | fluid velocity (rad/s) |
| $\dot{\Theta}_{case}$ | actuator case velocity (rad/s) |

TABLE 1-continued

| Variable | Definition |
|---|---|
| Variables in Equations 1 and 2 | |
| $J_{fluid}$ | fluid mass moment of inertia (kg-m²) |
| $\tau_{fluid}$ | transmitted torque (N-m) |
| $I_z$ | current (A) |
| L | channel length (m) |

The acceleration of the fluid in the channels is based on the generally known MHD equations which derives a cross-product of the electrical current $I_z$ and the applied radially oriented magnetic field $B_r$. The above equations quantify the generated torque about the axis on the channel with respect to the mercury proof mass. The angular momentum increase of the fluid induces a torque on the actuator case, and on any structure such as a platform to be stabilized in which the actuator is mounted. Thus, by selectively applying the voltage V to the actuator/sensor 10, the actuator/sensor 10 can be used to counteract vibrations of a device to which the actuator/sensor 10 is mounted, such as the vibrations of a platform (represented by $\tau_{platform}$ in FIG. 1). The device 10 also operates as a sensor of angular motion about the axis 11. When the channel 12 rotates, the inertial proof mass 18 tends to stay at rest. In response to rotation of the channel 12 with respect to the liquid proof mass 18 about the axis 11, the magnetic field $B_R$ generates, via MHD effects, a voltage V across the electrodes 15 and 17. With reference to Table 1, this voltage may be represented as:

$$V = B_r L(\dot{\Theta}_{fluid} - \dot{\Theta}_{case})r$$

The actuator represented by FIGS. 1 and 2 is designed for applications such as stabilization of an Inertial Reference Unit (IRU) platform. The required torque for generating the required angular displacements of the platform is based on the moment of inertia of the IRU stable platform. Using assumed values of the moment of inertia for the rotation degrees of freedom of, say, 0.015 Kg M², an angular acceleration profile can be generated that will allow the determination of the output torque versus input current frequency response of the actuator to be determined.

Figure 3:
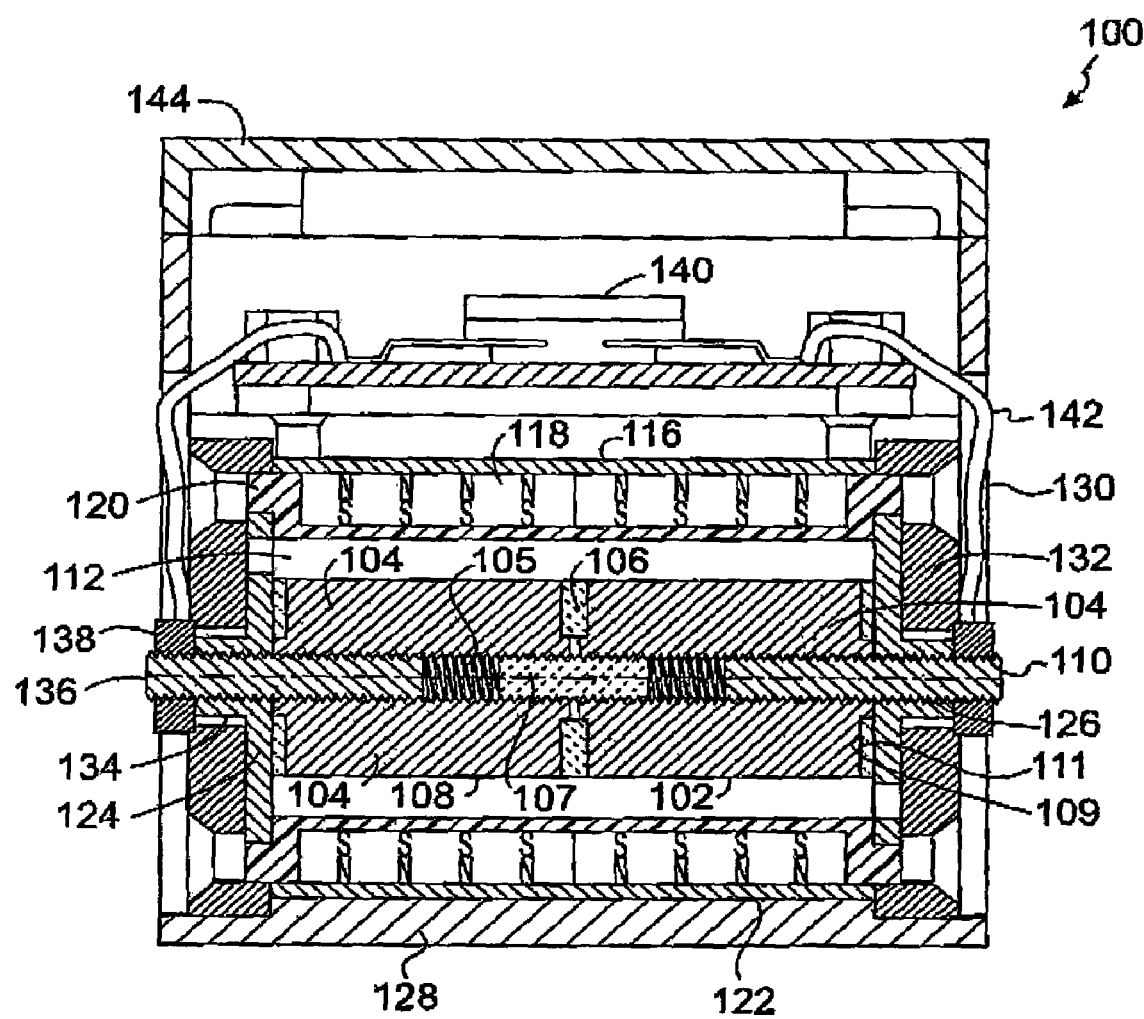
FIG. 3 is a section view of a practical embodiment of the invention.

FIG. 3 shows a practical MHD actuator/sensor 100 based on the embodiment illustrated in FIGS. 1 and 2, wherein a radial magnetic field and an axial current are generated. The actuator/sensor 100 includes an insulated inner cylinder 102 having a cylindrical axis 110 located along a sensing/force generating axis of the device 100. The inner cylinder 102 is made of first and second metal center bosses 104 that include threaded axial bore holes 105. The outer cylindrical surfaces 108 of the bosses 104 may be covered with heat shrink insulation to insulate the bosses. The axial ends 109 of the bosses 104 are free of insulating material. The bosses 104 are axially attached to and insulated from each other with an insulating threaded member or ceramic screw 107 that is threaded into the bore hole 105 of each boss 104. The bosses 104 are and are further insulated from one another by an insulating member 106, such as a ceramic washer, which is disposed between the bosses 104 in contact with an inner axial end of each boss 104.

The outer surface 108 of the inner cylinder 102 forms the inner circumferential surface of a cylindrical fluid channel 112 which contains a liquid proof mass 114, such as liquid mercury. A cylindrical magnet structure 116 forms an outer circumference of the channel 112. The magnet structure 116 may include first and second magnets 118, a magnet holder 120 located between the magnet(s) 118 and the liquid proof mass 114, and a magnet cover 122 surrounding the outer circumference of the magnet(s) 118. Axial ends of the channel 112 are covered by first and second channel covers 124 having holes 126 that are aligned with through-holes 105 in the center bosses 104. The channel covers 124 are made of an insulating material. Electrical contacts such as conductive washers 111 are fitted between the axial ends of the bosses 104 and the channel covers 124, thereby providing small regions of electrical conductivity between the bosses 104 and the liquid proof mass 114.

A pair of end caps 132 abut the channel covers 124. The end caps 132 include holes 134. A metallic case 128 surrounds the magnet structure, and includes first and second clearance holes 130 at axial ends thereof. A pair of electrodes such as threaded rods 136 extend through the clearance holes 130, holes 134 and holes 126, and are threaded into the bore holes 105 of the center bosses 104. Fasteners such as nuts 138 are provided on the electrodes 136 to force the end caps 132 against the channel covers 124 and to thereby force the channel covers against the insulated cylinder 102 as the nuts 138 are turned down on the electrodes 136. In this way, the fluid channel 112 is effectively sealed and the electrodes 136 can be maintained in secure electrical contact with the bosses 104.

The device 100 is provided with circuitry for generating and sensing torque. The circuitry includes a power source 140 mounted to the case 128 and leads 142 extending from the power source 140 to the electrodes 136 within the case 128. The power source may be, for example, a power op-amp. A cover 144 is provided to cover the power source 140.

In actuator mode, a voltage applied by the power source/op-amp 140 causes the fluid 114 to rotate about the inner cylinder 102, thereby generating a torque that acts on the case 128 and the device to which the actuator 100 is mounted. In sensor mode, rotation of the cylindrical channel 112 generates a voltage. The op-amp 140 amplifies the voltage signal produced by the contacts 136, thereby providing an indication of the torque applied to the device to which the sensor 100 is mounted.

An experimental device based on the model of FIG. 3 was constructed according to the design parameters listed in the following Table 3.

TABLE 3

Design Parameters for MHD Actuator of FIG. 3

| Parameter | Value | Units |
|---|---|---|
| Mercury Channel Length L | 0.0274 | meters |
| Mercury Channel Thickness h | 0.002 | meters |
| Radial Flux Density $B_r$ | 0.22 | Tesla |
| RMS Channel Radius, $r_{RMS}$ | 0.0066 | meters |
| Mercury Mass Moment of Inertia (MOI) | 1.056e-6 | kg-m$^2$ |
| Torque Scale Factor $K_t$* | 3.98e-5 | Newton-meters/Amp |
| Max Torque for 15A max current using the Apex PA13A Power Amp | 5.97e-4 | Newton-meters |
| Power Dissipation @ Peak Torque | 0.0765 | Watt |
| Rotational Actuator Constant (Torque) $K_{RA}$ | 0.0022 | Newton-meters/(Watt)$^{1/2}$ |

*Torque Scale Factor = $B_r$ L $r_{rms}$ = (0.22 T) (0.0274 m) (0.0066 m) = 3.98e-5 Nm/Amp. A maximum torque of about 6e-4 Newton-meters can be produced using the maximum current of 15A for the Apex PA13A. Higher torques could also be produced by higher current.

The experimental actuator/sensor vice was attached to an MHD Stable Reference Internal Reference Unit platform (MIRU, a controlled platform for providing an optical reference) to evaluate the performance of the actuator/sensor. An ARS-12A Angular Displacement Sensor (s/n F014, scale factor=100,000 V/rad) was also mounted to the platform to sense the angular displacement of the platform. The actuator/sensor was mounted with the torque axis aligned with the sense axis of the ARS-12A Angular Displacement Sensor.

Figure 4:
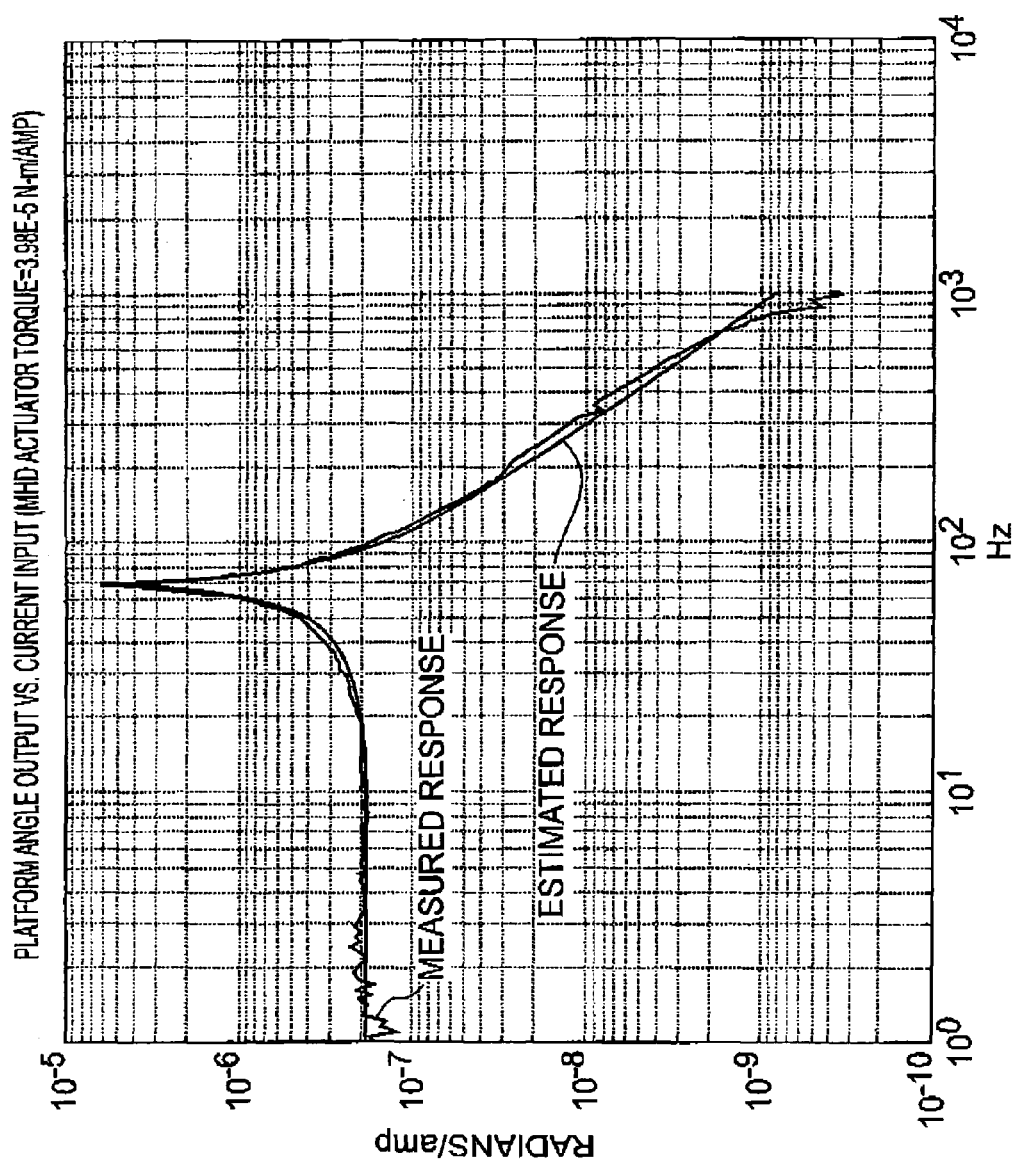
FIG. 4 illustrates the predicted platform angle of a standard platform versus the current applied to the MHD actuator of FIG. 3 versus frequency.
Figure 5:
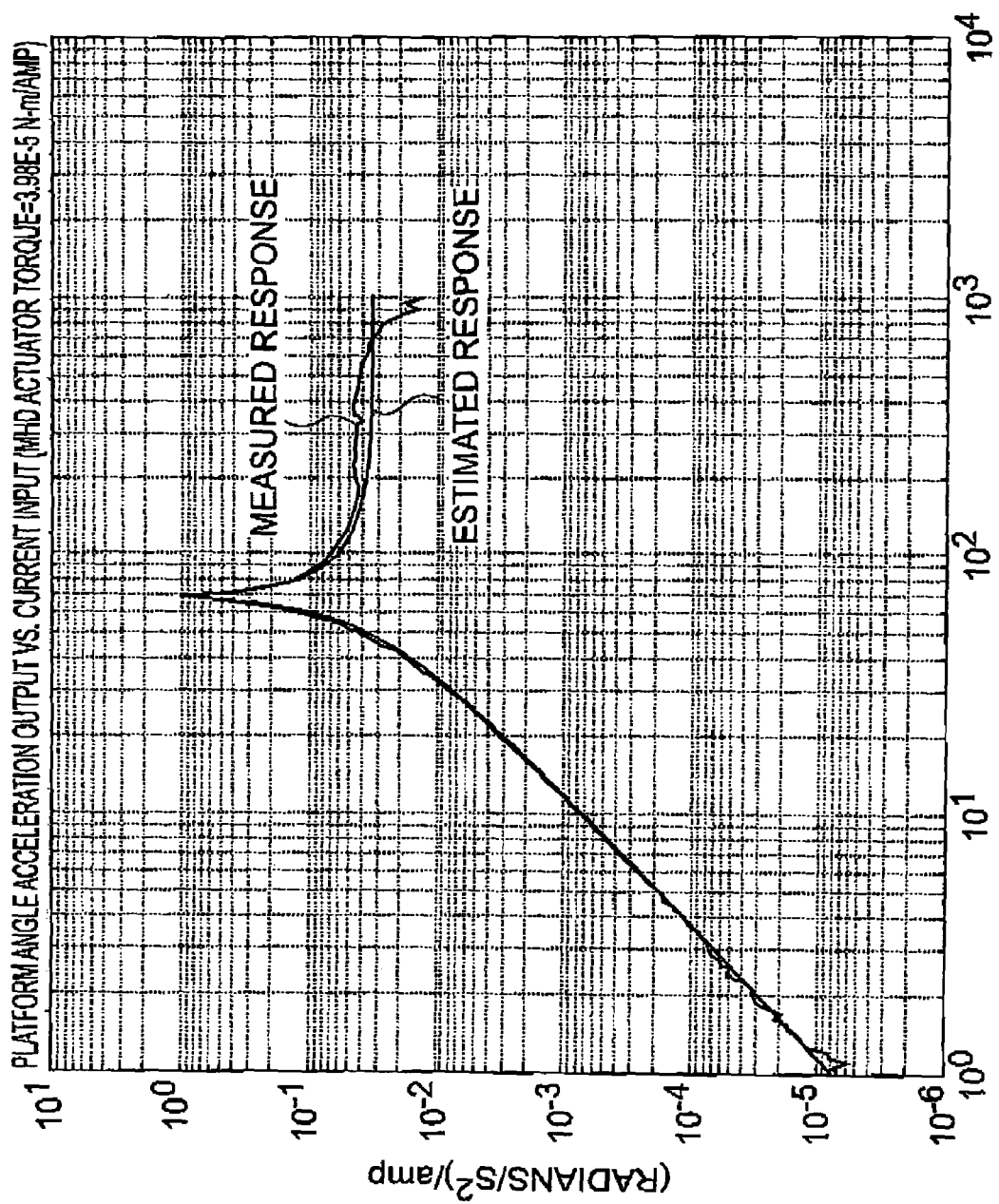
FIG. 5 is a simulation for the device of FIG. 3, representing the same test platform angular acceleration versus input current and frequency.

The torque produced by the actuator/sensor was then indirectly measured using the MIRU platform knowing the flexure torsional spring constant and damping, and the mass moment of inertia about the rotational axis and the angular motion produced as measured by the ARS-12A. The angular displacement output versus current input was measured for the EDM as plotted in FIG. 4. This can also be readily converted to the angular acceleration output versus current input to the actuator/sensor, plotted in FIG. 5, by simply multiplying every point in the displacement frequency response by $(2pf)^2$. The EDM torque scale factor can be indirectly calculated by knowing the spring constant and the moment of inertia (MOI) of the platform about the axis of rotation. The response is based of the estimated mass moment of inertia about the rotational axes of the MIRU platform with the ARS-12A and EDM mounted of $I_{x,y}$=0.0012 kgm$^2$ and a flexure rotational spring constant $K_\theta$ of 213 rad/Nm. The natural frequency $f_n$ of the MIRU platform was measured at 67 Hz and is defined as $f_n=(K_\theta/I_{x,y})^{1/2}/(2p)$. The rotational damping coefficient of the MIRU was not needed to calculate the torque but was estimated at $B_\theta$=0.015 (rad/s)/N–m. Based on the MIRU platform dynamics the torque constant was measured to be very close to the predicted torque of 3.95e-4 N–m/Amp. The second line overlaid on the graphs of FIGS. 4 and 5 is the estimated MIRU platform response for an MHD actuator/sensor with a torque constant of 3.95e-4 N–m/A.

Figure 6:
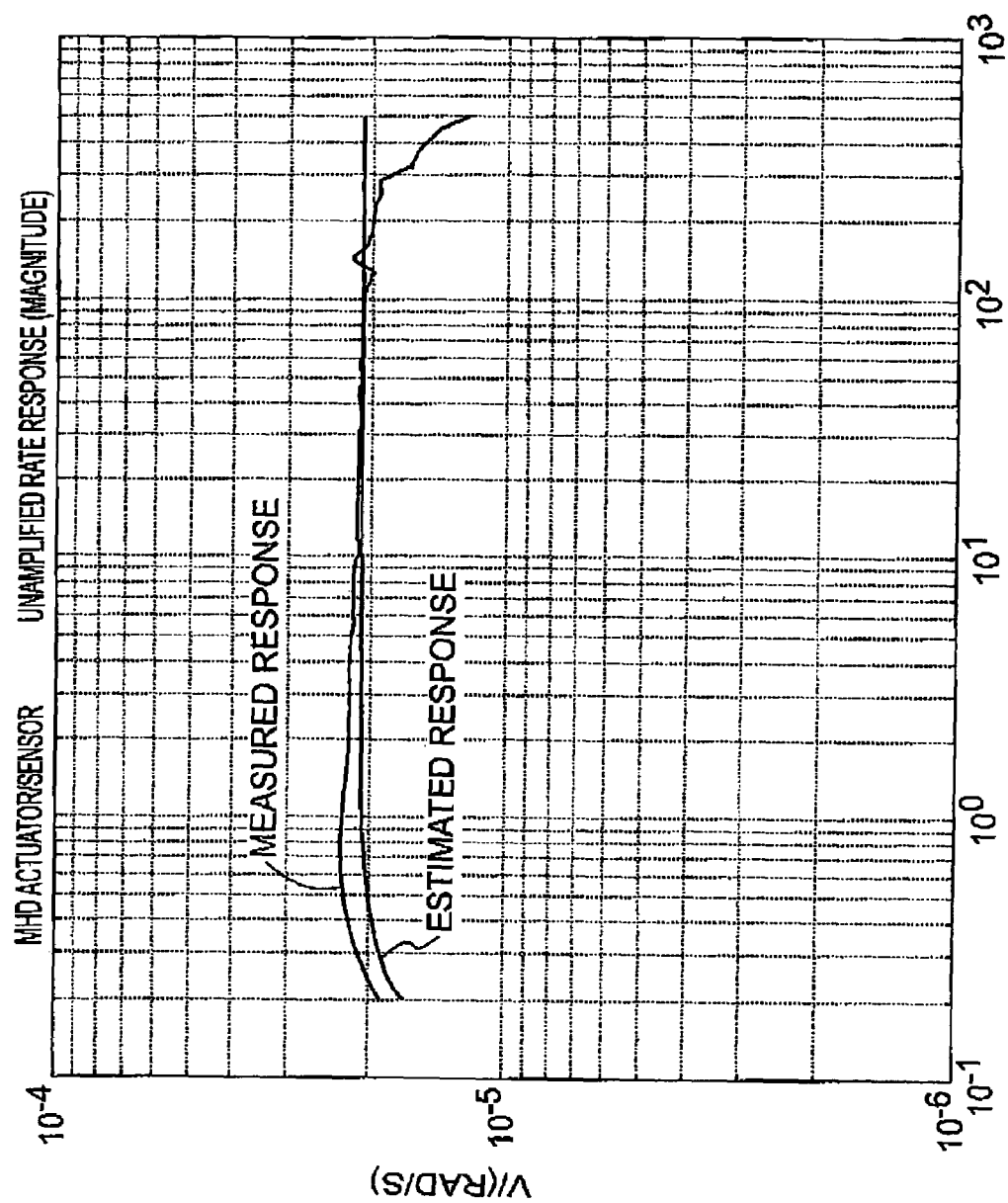
FIG. 6 illustrates the magnitude response versus frequency of the device of FIG. 3 to sensing a rotational angular velocity.
Figure 7:
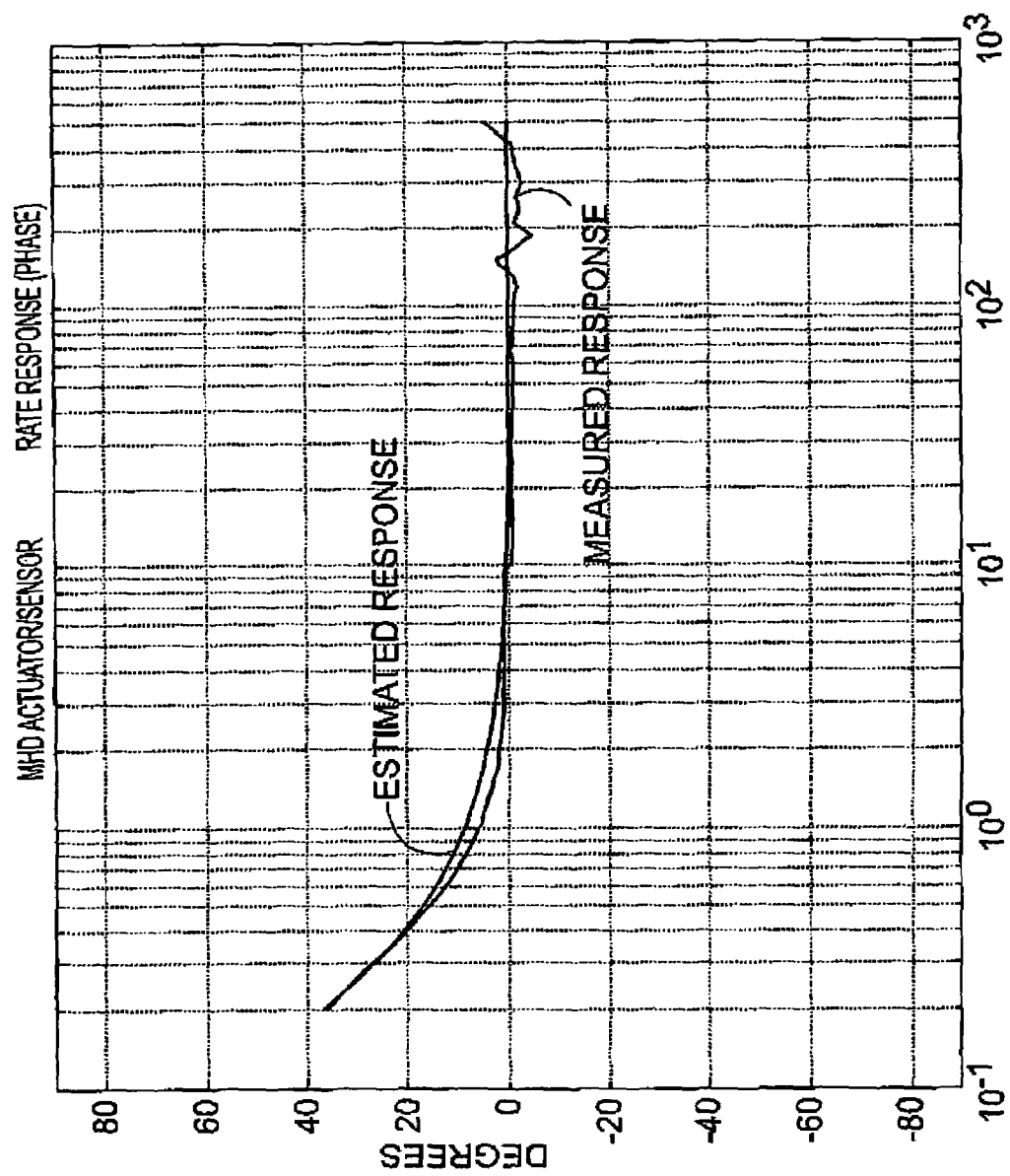
FIG. 7 is a predicted angular rate phase response versus frequency of the MHD actuator sensor of FIG. 3 in a sensor mode.

The actuator/sensor was also characterized for the rotational angular rate "sensing" function with regard to disturbances applied to the MIRU platform. FIG. 6 illustrates the measured magnitude response versus the estimated, or modeled, response. FIG. 7 illustrates the measured phase response compared to the modeled phase response for the actuator/sensor. The magnitude shown is the unamplified angular rate response.

Figure 8:
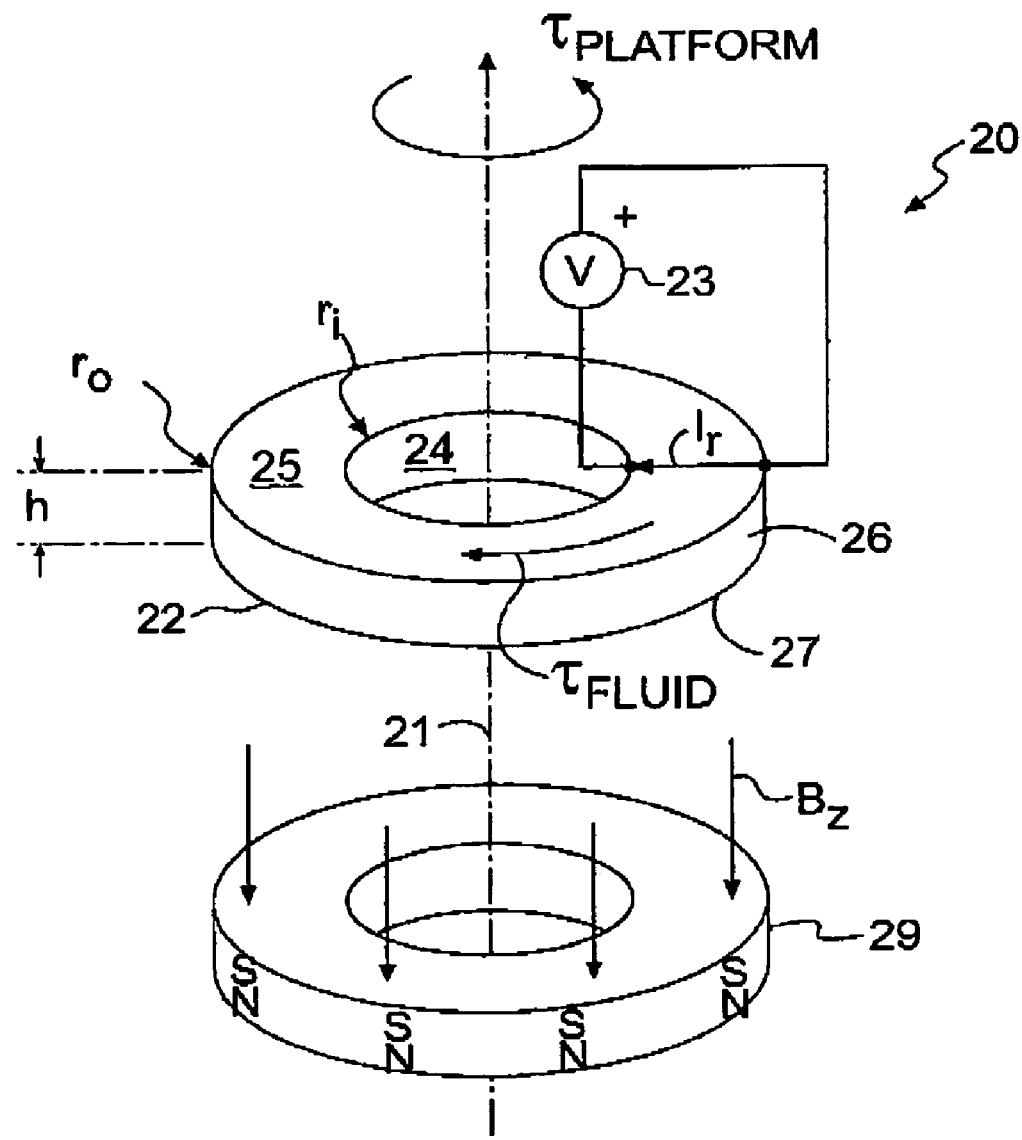
FIG. 8 is a schematic perspective view of an MHD actuator/sensor according to another embodiment.

As shown in FIGS. 4–7, by modeling and testing the torqueing and sensing functions of an MHD actuator/sensor, MHD sensors/actuators can be constructed with the parameters needed for successful operation in a given application FIG. 8 is a schematic perspective view of a MHD actuator sensor 20 according to another embodiment. The actuator/sensor 20 includes a cylindrical channel 22 supporting a conductive liquid proof mass 28 (i.e., mercury). The channel 22 includes an inner cylindrical wall 24 which includes or forms a first electrode and an outer cylindrical electrode 26 which includes or is a second electrode. The channel 22 is closed at its ends by insulating walls 25 and 27. A magnet ring 29 is arranged coaxial with the channel 22 along a common axis 21. The channel 22 and magnet ring 29 are enclosed in a casing (not shown). Applying a voltage V from a power source 23 across electrodes 24 and 26 generates a radial current $I_r$. The magnetic ring 29 generates an axial magnetic field $B_z$, which interacts with the current $I_r$ to cause the fluid 28 to rotate, thereby applying a torque $\tau_{fluid}$ to the actuator case (not shown). Thus, the actuator/sensor 20 may have the same practical applications as the actuator/sensor of the previous embodiment.

The general transmitted torque produced about the axis 21 on the channel 22 and the fluid angular acceleration which results in the torque are expressed as shown in the following equations 3 and 4, with reference to the legend presented in Table 3:

$$\tau_{fluid} = -J_{fluid}\ddot{\Theta}_{fluid} \quad (3)$$

$$\ddot{\Theta}_{fluid} = \frac{\nu}{h^2}(\dot{\Theta}_{case} - \dot{\Theta}_{fluid}) + \frac{B_z I_r}{A\rho r} \quad (4)$$

TABLE 3

Variables in Equations 3 and 4

| Variable | Definition |
| --- | --- |
| ν | kinematic viscosity (m²/s) |
| h | channel thickness (m) = ($r_o + r_i$) |
| r | rms channel radius (m) = (($r_o^2 + r_i^2$)/2)$^{1/2}$ |
| $B_z$ | channel flux density (T) |
| A | channel mean cross-section area (m²) = π ($r_o^2 - r_i^2$) |
| ρ | fluid density (kg/m³) |
| $\ddot{\Theta}_{fluid}$ | fluid angular acceleration (rad/s²) |
| $\dot{\Theta}_{fluid}$ | fluid velocity (rad/s) |
| $\dot{\Theta}_{case}$ | actuator case velocity (rad/s) |
| $J_{fluid}$ | fluid mass moment of inertia (kg-m²) |
| $\tau_{fluid}$ | transmitted torque (N-m) |
| $I_r$ | current (A) |
| W | channel width (m) = ($r_o - r_i$) |

The device 20 also operates as a sensor of angular motion about the axis 21. When the channel 22 rotates, the liquid mass 28 tends to stay at rest. The magnetic field $B_z$ generates via MHD effects a voltage V across the electrodes 24 and 26. In response to rotation of the channel 22 with respect to the liquid proof mass 28 about the axis 21, the magnetic field $B_z$ generates, via MHD effects, a voltage V across the electrodes 24 and 26. Referring to Table 3, this voltage may be represented as:

$$V = B_z W (\dot{\Theta}_{fluid} - \dot{\Theta}_{case}) r$$

Figure 9:
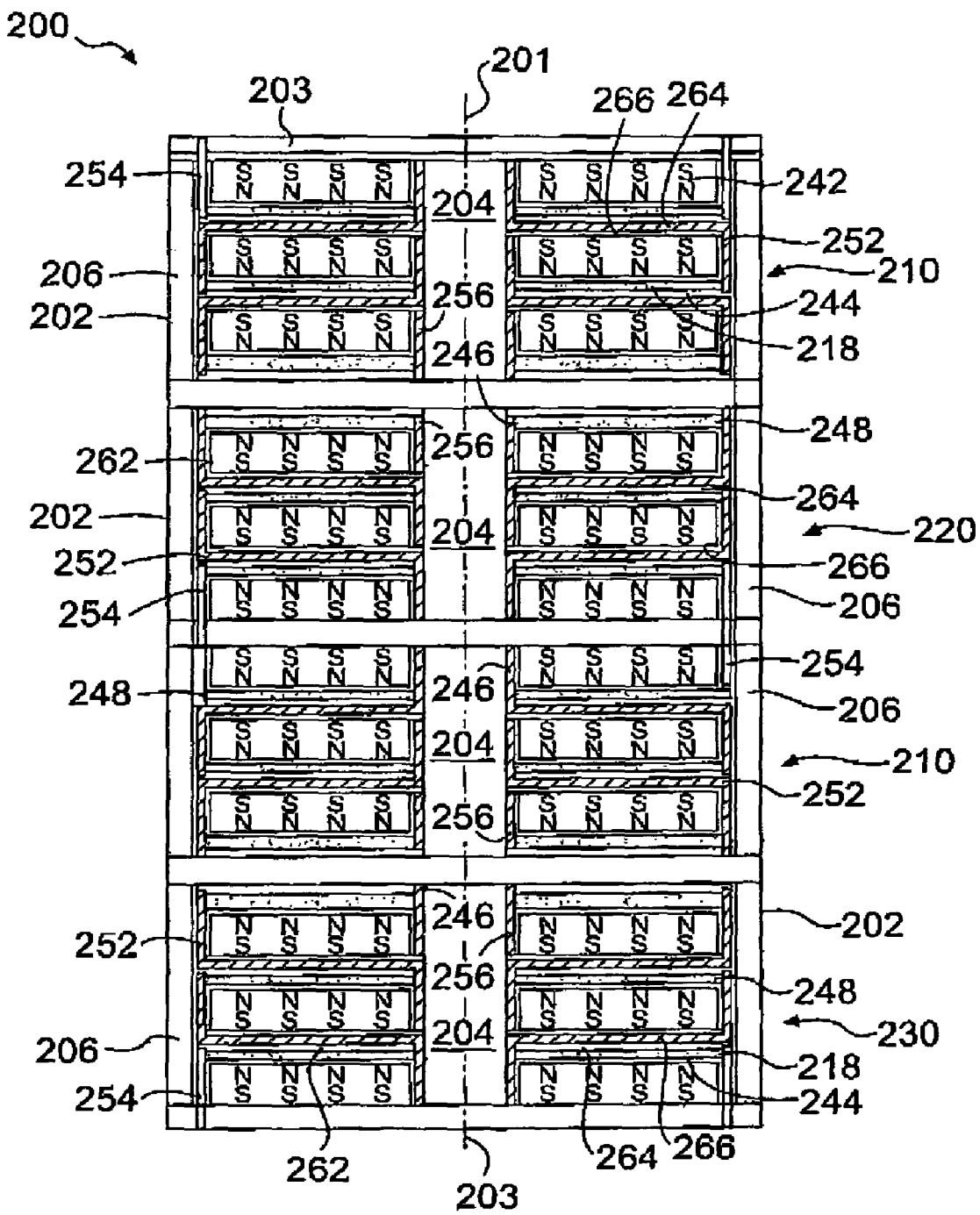
FIG. 9 is a section view of an MHD actuator/sensor according to another embodiment of the invention which is an advancement of the embodiment of FIG. 8.

FIG. 9 shows a more advanced, multiple-channel MHD actuator/sensor 200 derived from the embodiment of FIG. 8. As in the embodiment of FIG. 8, the actuator/sensor 200 has an axially-oriented magnetic field. As shown in FIG. 9, the sensor/actuator 200 includes a first MHD unit 210, a second MHD unit 220, a third MHD unit 210 identical to the first MHD unit, and a fourth MHD unit 230. The units 210, 220 and 230 are stacked in a row and fastened together.

Each MHD unit 210, 220, 230 includes case 202 having an inner wall member 204 extending along the center axis 201 of the device and an outer circumferential wall member 206 that is spaced from and concentric with the inner wall member 204. Three MHD channels, each including a magnet ring 242 and an annular fluid channel 244 positioned coaxial with magnet ring 242, are located within the case 202 such that they are stacked in a row around the inner wall member 204 and inside the outer circumferential wall member 206. As in previous embodiments, the annular fluid channel 244 contains a liquid proof mass 218, such as liquid mercury. The case 202 also includes end caps 203 enclosing the axial ends of the MHD unit 210, 220, 230.

MHD units 210, 220 and 230 are similar in structure, except that they employ the MHD channels with the magnet rings 242 in different polar orientations. More specifically, the magnet rings 242 in units 210 are arranged such that their polarities are opposite the polarities of the magnet rings 242 in init 220. By arranging units 210 and unit 220 with opposite polarities, the overall magnetic dipole moment of the actuator/sensor 200 is reduced. Unit 230 includes magnetic rings 242 of varying polar orientation.

Within a given unit 210, 220, 230, the MHD channels may be connected to each other in series and connected to circuitry including a power source, such as a power op-amp (not shown), by various arrangements of electrodes 252, 254, 256 contacting the inner circumferential walls 246 and the outer circumferential walls 248 of the annular fluid channels 244. Electrodes 252 extend between the inner circumferential wall 246 of one fluid channel and the outer circumferential channel 248 of another, adjacent fluid channel 246, thereby connecting adjacent MHD channels in series. The orientation and number of electrodes used will vary depending on the orientation of the magnet rings 242, the number of magnet rings 242 desired to be coupled together and the and the desired response of the actuator/sensor 200.

Insulating members 262, 264, 266 are provided to insulate the magnet rings 242, fluid channels 244, and electrodes 252, 254, 256 from each other, as needed. Additional insulating members may be provided to insulate the MHD unit from the case 202.

The MHD units 210, 220 and 230 are electrically connected in series. The result is a single actuator/sensor with increased capabilities for generating torque and sensing disturbances. Circuitry (not shown) may be connected to read or apply a voltage across selected electrodes 252, 254, 256 in the device 200 and thereby operate the device as an actuator and/or sensor for applying a torque or sensing a torque about the axis 201.

Estimated performance parameters for the twelve-channel MHD sensor/actuator embodiment are provided in Table 4 with the key parameters being the torque scale factor $K_t$ of 2.12e–3 N-m/A, and the rotational actuator constant $K_{RA}$ of 0.046 N-m/W$^{1/2}$. The embodiment of FIG. 9 exhibits a torque scale factor that is 53 times higher with a rotational actuator constant $K_{RA}$ that is 21 times better than the model based on the embodiment of FIG. 3. This is predominantly due to the improved internal design of the embodiment of FIG. 9.

TABLE 4

Enhanced MHD Actuator Design Parameters

| Parameter | Value | Units |
| --- | --- | --- |
| Actuator Parameters | | |
| Mercury Channel Width; L = 12*($r_o - r_i$) | 0.243 | meters |
| Mercury Channel Thickness; h | 0.001 | meters |
| Axial Flux Density Bz | 0.50 | Tesla |
| RMS Channel Radius, $r_{RMS}$ | 0.0175 | meters |
| Mercury Mass Moment of Inertia (MOI) | 4.47e-5 | kg-m² |
| Actuator Torque Parameters | | |
| Torque Scale Factor $K_t$* | 2.12e-3 | Newton-meter/Amp |
| Current Required for 1.5 rad/s² For AIRU (Ix,y = 0.0508 kg-m²) | 35.9 | Amperes |
| Channel Resistance | 0.0021 | Ohm |
| Rotational Actuator Constant $K_{RA}$ | 0.26 | Newton-meters/(Watt)$^{1/2}$ |
| Rate Sensor Parameters | | |
| Angular Rate Scale Factor** | 2.12e-3 | Volts/(radian/sec) |
| Est. Noise Equivalent Angle (NEA, 1-1 kHz BW) | 200 | Nanoradians RMS |

*Torque Scale Factor = $B_z$ W $r_{RMS}$ = (0.50 T) (0.243 m) (0.0175 m) = 2.12e-3 N-m/Amp
**Angular Rate Scale Factor = $B_z$ W $r_{RMS}$ = (0.50 T) (0.243 m) (0.0175 m) = 2.12e-3 Volts/(radian/s)

The embodiment of FIG. 9 shows only one possible configuration for a multiple-channel actuator/sensor. Many other configurations are possible, including actuators/sensors with any number of MHD channels. Additionally, each MHD unit could be configured to include less than three MHD channels or more than three MHD channels.

Figure 10:
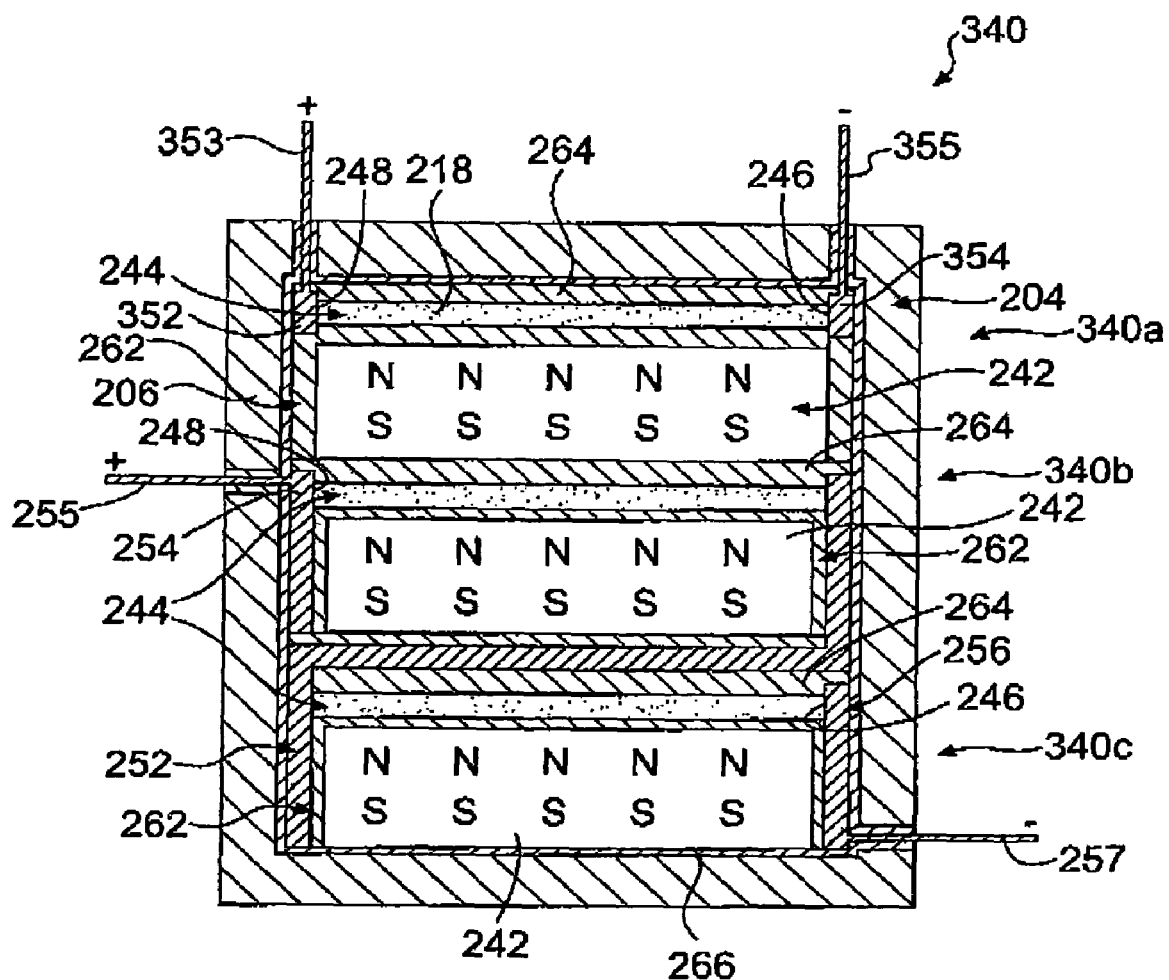
FIG. 10 is a section view of a portion of a single cell of a multiple channel MHD actuator/sensor.

FIG. 10 shows a section view of one half of an MHD unit 340 according to another embodiment, wherein reference numerals shared with FIG. 9 indicate similar components. Unit 340 shows a configuration that uses one MHD channel 340*a* as a sensor and two other MHD channels 340*b*, 340*c* connected in series as a torquer. The unit 340 could be employed in a device similar to the one shown in FIG. 9.

MHD channel 340*a* is electrically isolated from channels 340*b* and 340*c* and includes a pair of electrodes 352 and 354 in contact with the outer circumferential wall 248 and the inner circumferential wall 246, respectively, of an annular fluid channel 244. Electrodes 352 and 354 are provided with positive and negative leads 353 and 355, respectively. As the MHD channel 340*a* is isolated from the MHD channels 340*b*, 340*c*, it can be used as a sensor independently of channels 340*b* and 340*c*.

MHD channels 340*b* and 340*c* are connected in series by an electrode 252. The electrode 252 extends between the inner circumferential wall 246 of the annular fluid channel in MHD channel 340*b* and the outer circumferential wall 248 of the annular fluid channel in MHD channel 340*c*. An electrode 254 in contact with the outer circumferential wall 248 of the annular fluid channel in MHD channel 340*b* is provided with a positive lead 255. An electrode 256 in contact with the inner circumferential wall 246 of the annular fluid channel in MHD channel 340*c* is provided with a negative lead 257. Thus, the MHD channels 340*b* and 340*c* may receive a voltage applied across the leads 255 and 257 and operate as a torque applying actuator while the MHD unit 340*a* acts as a sensor.

The foregoing description of the invention illustrates and describes the present invention. Additionally, the disclosure shows and describes only selected preferred embodiments of the invention, but it is to be understood that the invention is capable of use in various other combinations, modifications, and environments and is capable of changes or modifications within the scope of the inventive concept as expressed herein, commensurate with the above teachings, and/or within the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments, not explicitly defined in the detailed description.

The invention claimed is:

1. An MHD sensor/actuator comprising:
a cylinder having an outer insulated surface with a cylindrical axis located along a sensing/force generating axis, forming an inner circumferential surface of a fluid channel;
first and second electrodes supported on opposite ends of said cylinder contacting respective opposite ends of said fluid channel;
a cylindrical magnet structure forming an outer circumference of said cylindrical fluid channel and having a radial magnetic field directed through said cylindrical fluid channel;
first and second electrical contacts extending into said insulating cylinder and contacting said first and second electrodes; and
circuitry connected to said first and second electrical contacts for generating an actuating current for said sensor/actuator or receiving a voltage from said sensor/actuator.

2. The MHD sensor/actuator of claim 1 wherein said cylindrical magnet structure comprises:
first and second cylindrical magnets having a common magnetic field orientation.

3. The MHD sensor/actuator of claim 1, wherein said fluid channel contains mercury.

4. The MHD sensor/actuator of claim 1 further comprising first and second end caps for sealing the ends of said cylindrical fluid channel and supporting with said insulating cylinder said electrodes in contact with said fluid channel.

5. The MHD sensor/actuator of claim 1 further comprising a metallic case surrounding said magnet structure, said metallic case having first and second clearance holes through which said electrical contacts extend.

6. An MHD sensor/actuator comprising:
an insulated cylinder defining a surface of a fluid channel along a circumference of said insulated cylinder;
an insulated magnet surrounding the insulated cylinder and forming a second surface of said fluid channel;
first and second electrodes at each end of said insulated cylinder which contact the fluid channel;
first and second channel covers for sealing opposite ends of said fluid channel;
first and second threaded electrical contacts which are threaded in said insulated cylinder and are in electrical contact with said first and second electrodes, said first and second threaded electrical contacts extending outwardly through said channel covers;
first and second end caps abutting said channel covers and having a hole through which said first and second threaded electrical contacts extend, each of said electrical contacts having a fastener for forcing said end caps against said channel covers and said insulated cylinder;
a metal case enclosing said end caps and said magnet; and
an electrical circuit connected to said first and second electrical contacts.

7. The MHD sensor/actuator of claim 6 wherein said insulated cylinder comprises first and second metal bosses separated by an insulating member, and a having a cylindrical surface covered with an insulation layer which extends from said first electrode to said second electrode.

8. The MHD sensor/actuator of claim 7 wherein said electrodes are disposed between said channel covers and said metal bosses in electrically contacting said metal bosses and said fluid channel.

9. The MHD sensor/actuator of claim 6 wherein said electrical circuit provides a driving current to said electrical contacts for generating a torque on said metal case.

10. The MHD sensor/actuator of claim 6 wherein said electrical circuit includes an amplifier connected to said first and second contacts for amplifying a signal produced by said contacts.

11. The MHD sensor/actuator of claim 6 wherein said fluid channel includes mercury.

12. An MHD sensor/actuator comprising:
a column of liquid which rotates within a circumferential channel having an inner circumferential surface and an outer circumferential surface with a common axis;

a cylindrical column of magnets coaxial with said circumferential channel which produces a radial magnetic field;

first and second contacts which connect to each end of said column of liquid;

first and second end caps which seal a top and bottom of said cylindrical channel; and connection means for connecting said contacts to electronic circuitry for applying a current to said channel in an actuator mode or sensing a voltage developed across said channel in a sensing mode.

13. The MHD sensor/actuator according to claim 12, wherein angular acceleration $\ddot{\Theta}_{fluid}$ of said sensor/actuator is determined as:

$$\ddot{\Theta}_{fluid} = \frac{\upsilon}{h^2}(\dot{\Theta}_{case} - \dot{\Theta}_{fluid}) + \frac{-B_r I_z}{A\rho r}$$

where:
  $\upsilon$ is kinematic viscosity;
  h is channel thickness;
  r is channel RMS radius;
  $B_r$ is channel radially oriented flux density;
  A is channel mean cross-sectional area;
  $\rho$ is fluid density;
  $\dot{\Theta}_{case}$ is actuator case angular velocity;
  $\dot{\Theta}_{fluid}$ is fluid angular velocity; and
  $I_z$ is axially applied electrical current.

14. The MHD sensor/actuator according to claim 12 wherein a sensor/actuator torque generated about said axis is determined as: $\tau = -J_{FL}\ddot{\Theta}_{FL}$, where $\tau$ is the actuator/sensor torque, $J_{FL}$ is fluid mass moment of inertia and $\ddot{\Theta}_{FL}$ is fluid angular acceleration.

15. An MHD actuator/sensor comprising:
  a cylindrical fluid channel containing a conductive liquid;
  a cylindrical magnet structure forming an outer circumference of said cylindrical fluid channel and having a radial magnetic field directed through said cylindrical fluid channel;
  electrical contacts contacting electrodes on opposite ends of said fluid channel; and
  circuitry connected to said first and second electrical contacts for generating an actuating current for said actuator/sensor or receiving a voltage from said actuator/sensor.

16. An MHD actuator/sensor comprising:
  an annular fluid channel containing a conductive liquid;
  a magnet ring positioned adjacent to and coaxial with said annular fluid channel and having an axial magnetic field directed along a common axis of said annular fluid channel and said magnet ring;
  first and second electrical contacts contacting electrodes at inner and outer circumferential walls of said fluid channel; and
  circuitry connected to said first and second electrical contacts for generating an actuating current for said actuator/sensor or receiving a voltage from said actuator/sensor.

17. An MHD actuator/sensor comprising:
  a plurality of MHD channels electrically connected in series, wherein each of said plurality of MHD channels comprises:
    an annular fluid channel containing a conductive liquid;
    a magnet ring positioned adjacent to and coaxial with said annular fluid channel and having an axial magnetic field directed along a common axis of said annular fluid channel and said magnet ring;
    first and second electrical contacts contacting electrodes at inner and outer circumferential walls of said fluid channel; and
    circuitry connected to said first and second electrical contacts for generating an actuating current for said actuator/sensor or receiving a voltage from said actuator/sensor.

18. The MHD actuator/sensor of claim 17, comprising at least one electrode electrically connecting an inner circumferential wall of an annular fluid channel of one of said plurality of MHD channels to an outer circumferential wall of an annular fluid channel of another, adjacent one of said plurality of MHD channels.

19. The MHD actuator/sensor of claim 17, wherein said plurality of MHD channels is separated into at least two MHD units, each comprising one or more of said plurality of MHD channels, wherein adjacent MHD units within said at least two MHD units have opposite magnetic polarities.

* * * * *

UNITED STATES PATENT AND TRADEMARK OFFICE
CERTIFICATE OF CORRECTION

PATENT NO.           : 7,171,853 B1                                              Page 1 of 1
APPLICATION NO.      : 11/239283
DATED                : February 6, 2007
INVENTOR(S)          : Darren R. Laughlin It is certified that error appears in the above-identified patent and that said Letters Patent is hereby corrected as shown below:

In the Specification

Column 1, line 43, delete "dowel" and substitute -- channel --

Column 2, line 59, delete "one" and substitute -- one embodiment --

Column 3, Table 1, line 61, the formula reading - ($r_o + r_i$) - should read -- ($r_o - r_i$) --

Column 4, line 40, delete "$M^2$" and substitute -- $m^2$ --

Column 6, line 21, delete "$(2pf)^2$" and substitute -- $(2\pi f)^2$ --; line 30, delete "(2p)" and substitute -- ($2\pi$) --

Column 7, Formula (4) that portion of the formula reading -- $\frac{B_z I_r}{A\rho r}$ -- should read -- $\frac{-B_z I_r}{A\rho r}$ --; line 64, delete "init" and substitute -- unit --

Signed and Sealed this
Twenty-second Day of March, 2016

Michelle K. Lee
*Director of the United States Patent and Trademark Office*